Patented Jan. 12, 1943

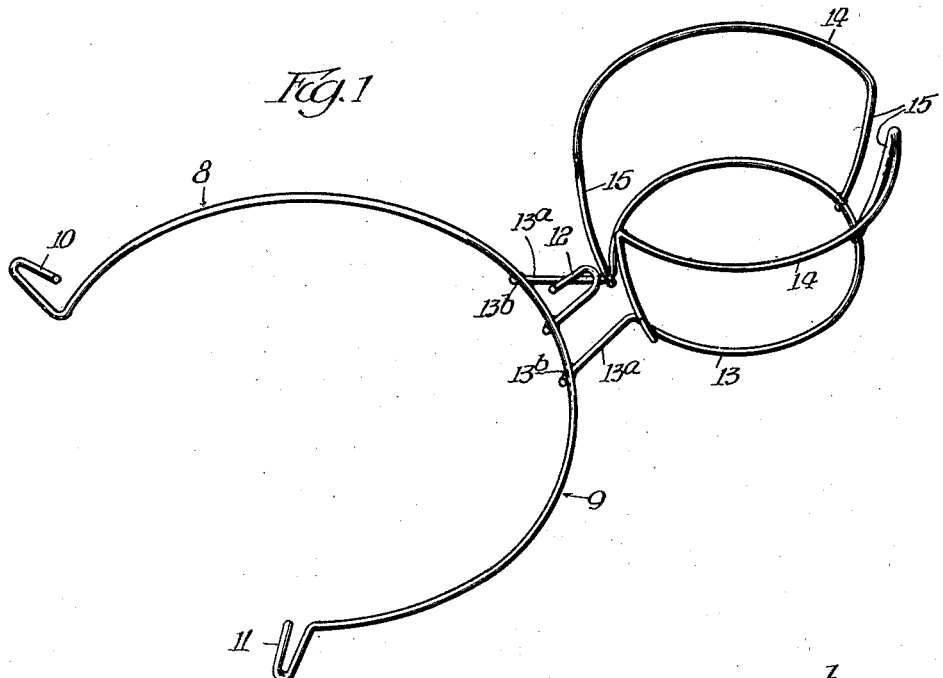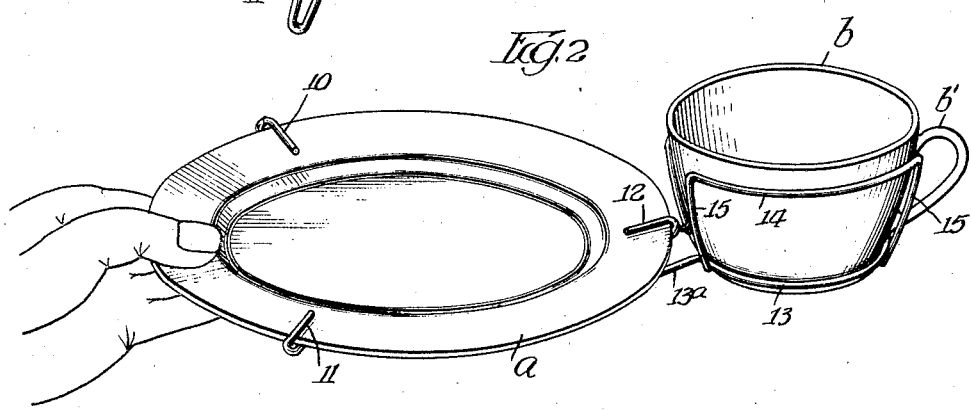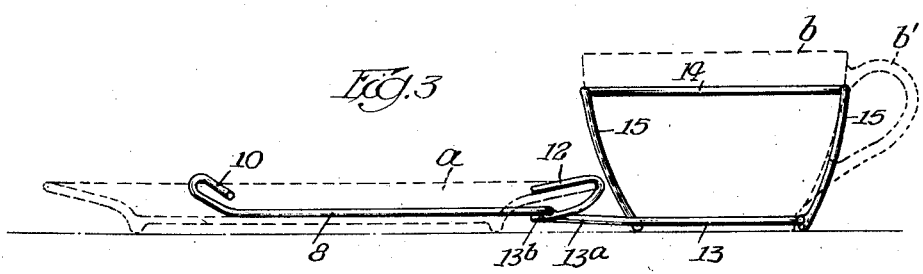

2,307,882

UNITED STATES PATENT OFFICE 2,307,882

COMBINED FOOD AND BEVERAGE SERVER

Joseph Freud, Chicago, and Roy P. Kidston, Wheaton, Ill.

Application December 4, 1939, Serial No. 307,420

5 Claims. (Cl. 65—53)

The invention relates to food servers.

In serving food and beverages at social functions or other affairs, it is frequently desired to individually serve to each person a plate with food and a cup containing a beverage, such, for example, as coffee or tea. When the service is made without a tray, it is difficult to hold both the plate and cup while consuming the food and drinking the beverage. When a tray is used for serving, it is difficult or inconvenient to retain the plate and cup thereon while eating or drinking.

One object of the invention is to provide an individual server or device whereby the plate with food thereon any filled cup may be easily and securely supported by one hand so as to leave the other entirely free for use in eating and drinking.

Another object of the invention is to provide a server of this type which is simple in construction and is adapted to conveniently support a cup and a plate in associated relation.

Other objects of the invention will appear from the following detailed description.

The invention consists in the several novel features which are hereinafter set forth and are more particularly defined by claims at the conclusion hereof.

In the drawing: Fig. 1 is a perspective of the server embodying the invention. Fig. 2 is a perspective of the server with a plate and cup carried thereby. Fig. 3 is a vertical longitudinal section of the server.

The invention is exemplified in a server which comprises a frame which is provided with members for gripping a plate $a$ so the frame and plate will be secured against relative movement and can be supported by one hand either by grasping the plate or the frame and a cup-holder on and disposed at one side of the frame, so it will also be supported against tipping by the frame and in associated relation with the plate, and so that the cup $b$ may be lifted from, and replaced in, the cup-holder for drinking purposes. For simplicity, lightness and economy in manufacture, the server is preferably formed of wire.

In the construction shown, the frame comprises: a pair of curved arms 8 and 9, which are adapted to extend around the usual annular base rib of the plate and to underlie the rim portion of, and support the plate, a pair of upstanding hooks 10 and 11 at the outer free ends of arms 8 and 9, respectively, and a hook 12 at the curved connecting portions of arms 8 and 9. Arms 8 and 9 are resilient so that a plate with food thereon can be slipped laterally into all of the hooks by forcing the outer ends of the arm and hooks 10 and 11 apart, so that the plate will be gripped by the frame and the plate and frame will be secured together against relative movement in all directions and so that the frame can be firmly supported from the plate when the latter is grasped in one hand as well as when the frame is grasped. Hooks 10, 11 and 12 extend around and over the rim and are equidistantly spaced around the plate so that when the plate is slipped under the hooks, the frame and plate will be reliably connected together. Arms 8 and 9 and hooks 10 and 11 are integral and formed of a single strip of wire. Hook 12 is formed of a strip of wire welded to the strip forming the arms.

The cup-holder comprises: a lower ring 13 formed of a strip of wire having its ends extended as at $13^a$ and welded at $13^b$ to the wire forming arms 8 and 9; and a pair of upper members 14 also formed of wire, each comprising an arcuate side adapted to extend around one side of the upper portion of the cup, and integral legs 15 having their lower ends welded to ring 13. Legs 14 are spaced apart to form upward openings or pockets for receiving the ear $b^1$ of the cup $b$.

This construction exemplifies a server which comprises a frame adapted to removably receive and grip the plate containing food and a holder for a filled cup supported by, and connected to, the plate-frame which is disposed to conveniently hold a cup at one side of, and in associated relation with, the plate and so that the plate, cup and frame can be supported by one hand. The cup is supported so its bottom will be approximately on a level with the bottom of the plate $a$. One of the pockets between legs 14 is disposed at the side opposite to the plate so that the ear of the cup will be located within easy reach of the right hand while the server is supported with the left hand. When the user is consuming the food on the plate $a$, it is only necessary to grasp the plate $a$ or any part of the frame with one hand, which leaves the other hand free for manipulating the food and the cup for drinking.

In the exemplification shown in Figs. 1 to 3 the server is formed of wire, for lightness and economy of production.

The invention exemplifies an individual server for foods and beverages which makes it possible for the user to conveniently hold both a filled cup and a plate with food thereon in side-by-side relation by means of one hand, so as to leave the other hand free for use in eating and drinking. The device is light in weight and can be economically produced.

The invention is not to be understood as restricted to the details set forth, since these may be modified within the scope of the appended claims, without departing from the spirit and scope of the invention.

Having thus described the invention, that we claim as new and desire to secure by Letters Patent is:

1. An individual portable food and liquid server comprising a strip of wire curved to underlie the marginal portion of a plate containing food, having its ends spaced apart, integral upstanding hooks on the ends of the strip of wire, and a cup-holder comprising a ring formed of wire and extending laterally from and secured to the central portion of the strip of wire, and upper members formed of wire, each having legs secured to the ring.

2. An individual portable food and liquid server comprising a resilient loop of wire provided at its ends with upstanding hooks spaced apart for yieldingly grasping the rim of the plate between them, the loop extending continuously under the rim of the plate between said hooks, another upstanding hook rigidly joined to the loop centrally between the hooks on the ends of the loop for grasping the rim of the plate, and a cup-holder rigidly secured to the loop and disposed to support a cup outwardly of the rim.

3. An individual portable food and liquid server comprising a resilient loop of wire provided at its ends with upstanding hooks spaced apart for yieldingly grasping the rim of the plate between them, the loop extending continuously under the rim of the plate between said hooks, another upstanding hook rigidly joined to the loop centrally between the hooks on the ends of the loop for grasping the rim of the plate, and a cup-holder formed of wire rigidly secured to the loop adjacent said other hook and provided with means forming a cup-receiving and retaining pocket outwardly of the rim of the plate.

4. An individual portable food and liquid server comprising a resilient frame adapted to underlie the plate and provided at its end with upstanding hooks for resiliently grasping the rim of the plate between them, means rigid with the frame centrally between the hooks for grasping the rim of the plate, and a cup-holder rigidly secured to the frame adjacent said grasping means, disposed outwardly of the rim of the plate, and provided with members forming an open top pocket in which the cup will be held against lateral displacement.

5. An individual portable food and liquid server comprising a resilient frame adapted to underlie the plate and provided at its ends with upstanding hooks for resiliently grasping the rim of the plate between them, means rigid with the frame centrally between the hooks for grasping the rim of the plate, and a cup-holder rigidly secured to the frame adjacent said grasping means, disposed outwardly of the rim of the plate, and provided with members forming an open top pocket in which the cup will be held against lateral displacement, and also forming a vertically extending pocket for the handle of the cup.

JOSEPH FREUD.
ROY P. KIDSTON.